July 27, 1926.

J. A. STREET 1,593,732

COUPLING MECHANISM

Filed August 25, 1923

INVENTOR.

BY James A. Street

Ralzemond A. Parker

ATTORNEY.

Patented July 27, 1926.

1,593,732

UNITED STATES PATENT OFFICE.

JAMES A. STREET, OF DETROIT, MICHIGAN, ASSIGNOR OF ONE-HALF TO HUGO C. ZEITZ, OF CLARKSBURG, WEST VIRGINIA.

COUPLING MECHANISM.

Application filed August 25, 1923. Serial No. 659,327.

My invention relates to coupling mechanism.

I have illustrated my improvement in a tool-holding chuck, a device for use in connection with which it is particularly adapted. It is there shown as coupling the driving member with the driven tool-holding member in such a manner that when the resistance to rotation imposed upon the driver tool-holding member reaches a determined point the coupling mechanism automatically releases to permit the driving member to overrun the driven member. Upon its release the driving member will continue to overrun the driven member without the coupling mechanism re-engaging the parts to rotate as one piece so long as rotation continues in the same direction. When the direction of rotation is reversed the couplers are placed in position to engage the members for operation so that the driven member and driving member will again rotate together as a unit.

My invention is also adaptable for use in coupling shaft sections together in place of the shearing pins now used for that purpose where it is desired that the sections be so coupled as to release upon increase of resistance to rotation beyond a certain point.

My improved structure is a simple, sturdy structure, efficient in operation and consisting of a minimum of parts.

In the drawing,—

Figure 1:
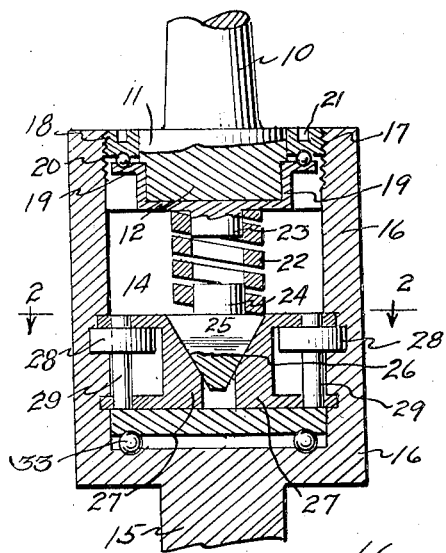
Figure 1 is a vertical sectional view.
Figure 3:
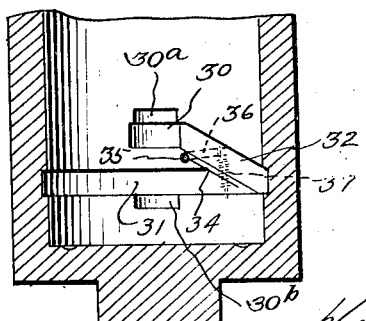
Fig. 3 is a sectional view through the barrel casing showing the interior thereof.

In tool-holding chucks it is peculiarly desirable that the construction be such that the driven tool be automatically released from the driving power when the resistance to its rotation increases beyond a certain point, otherwise breakage will result. This is particularly true in multiple drilling and tapping operations and in bolting operations.

My invention comprises a rotatable driving member and a driven member to be rotated thereby and improved coupling mechanism to releasably engage said members to rotate as one piece adapted to automatically release to permit the driven member to remain stationary if the resistance to its rotation increases to the danger point of breakage, allowing the driving member to overrun the driven member, and as exemplified in a tool-holding chuck consists of a driving member 10 provided with a shank having an enlarged head 11 which is provided with a diametrically extending axial projection 12 receivable within the diametrically cored out opening 13 of a cylindrical coupler head 14 to rotate said head with the driving member.

The driven member 15 is provided with a barrel casing 16 which encloses the operating parts of the coupler mechanism and is interiorly threaded at the upper end as at 17 to receive a threaded annular ball race member 18. This race member 18 co-operates with an annular bearing race plate 19 between which are mounted bearing balls 20. This race member 18 is adapted as at 21 to receive a wrench to permit its threaded adjustment within the barrel to increase or decrease the tension on a coil spring 22 which is disposed within the opening 13 in the coupler head 14 and seats at its upper end over an axial stud 23 which extends downwardly from the race plate 19 and at the lower end seats over a shank 24 which extends upwardly from a keystone member 25 to hold said keystone member yieldingly downwards.

This keystone member 25 is disposed between the opposed beveled ends 26 of a pair of blocks which are disposed for slidable movement radially in the diametrical recess 13 of the coupler head 14 to hold said blocks outwardly toward the wall of the barrel 16. The keystone member is movable axially and yieldable upwardly against the tension of the spring 22 to permit inward movement of said blocks radially.

Figure 2:
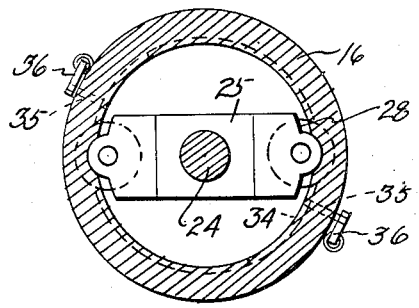
Fig. 2 is a sectional view taken on the line 2—2 Fig. 1.
Figure 4:
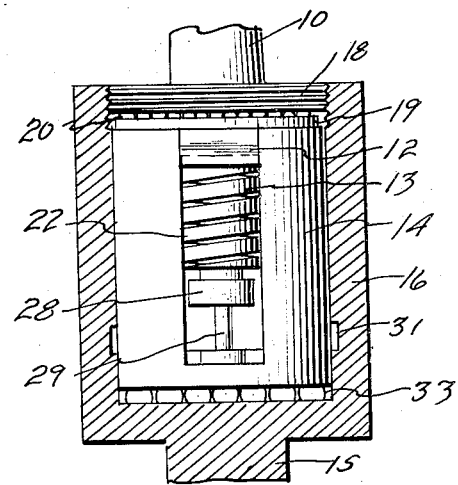
Fig. 4 is a vertical cross-sectional view taken at an angle to the view in Fig. 1.

Each block carries at its outer end a roller 28 mounted for axial movement upon an axle 29, which roller extends outwardly beyond the end of the block, as shown in Figs. 1 and 2. These rollers are shown as disposed on opposite sides of the cylindrical head 14 adapted to engage in recesses 30 formed in the interior of the barrel casing 16 to lock the coupler head and therethrough the driving member with the barrel casing to rotate as one piece.

Interiorly of the casing, offset the recesses 30, is an annular groove 31, and leading to this groove from each recess 30 is an angularly extending groove 32. The coupler head 14 is supported from the bottom of the barrel casing 16 by roller bearings 33. The driven member may be adapted to support a tool. This is a conventional construction and not shown in the drawing.

Figure 5:
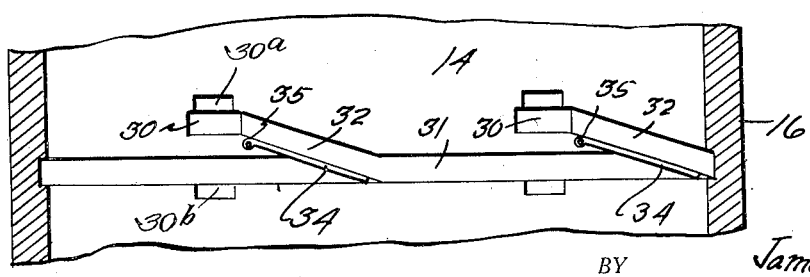
Fig. 5 is an enlarged sectional view through the barrel casing showing the interior of the construction.

Interfering plates 34 are provided one on each side of the barrel casing. Each plate is mounted on a pivotally supported pin 35 which extends through the barrel casing 16 and is provided exterior the casing with an angularly extending lever which is held yieldingly to one side by a spring 37 so that the plate 34 is held normally in the position shown in Fig. 5 to obstruct the travel through the groove 31 of the coupler roller when the travel is in a counter-clockwise direction looking down on the construction shown in Fig. 5 while permitting the roller to travel through the groove in the clockwise direction viewing the construction in Fig. 5 from the same point. In the latter case the roller lifts the plates against the resistance of the springs 37. When traveling in the counter-clockwise direction the roller is shunted out of the groove 31 into the groove 32 by the plate 34 which obstructs the groove 31.

In the operation of the mechanism, considering the invention as applied to a tool holder and the rollers 28 as engaged in the recesses 30 in the casing, being held outwardly therein by the spring-controlled keystone 25, which forces the blocks 27 apart radially, the driving and driven members will rotate as one piece. Above each recess 30 is a cut-out 30ª and on a vertical line with this cut-out 30ª but below the groove 31 is a second cut-out 30ᵇ. These cut-outs 30ª and 30ᵇ are of less depth than the recesses 30 and receive the ends of the blocks 27 as shown in Fig. 1. The recesses 30 are of greater depth than the angular grooves 32. The point of breakage of the tool has been determined and the tension of the spring 22 has been regulated by the threaded adjustment of the annular member 21 relative to the casing 16. When the resistance to rotation of the driven member has reached a determined point blocks 27 are forced inwardly and the keystone 25 elevated against the resistance of the spring 22. Each roller leaves its recess 30 and travels through the angular groove 32 to enter the annular groove 31. Each roller is mounted on its axle for axial movement and with sufficient freedom to permit its travel through the groove 32. The rollers can now travel freely within the groove 31 in one direction, the driving member overrunning the driven member. The plates 34 are lifted out of the way by the rollers each time they come in contact therewith. This action may continue so long as the driving member is overrunning the driven member in the forward direction of travel. When it is desired to again lock the members together for operation the direction of rotation is reversed and upon the reversal of the direction of rotation the roller 28 strikes the plate 34 and is prevented from continuing in its travel in the groove 31 and caused to ride upwardly in the groove 32 to enter the recess 30. The driving and driven members are now locked together to rotate as a unit.

What I claim is:

1. In a device of the character described, a rotatable driving member, a rotatable driven member adapted to be coupled thereto to rotate therewith, said driven member provided with a barrel head having an interior annular groove and angular grooves communicating therewith terminating in depressions to receive locking devices, locking devices carried by said driving member to rotate therewith held yieldingly outward radially to engage in said depressions to cause the driven member to rotate with the driving member and movable inwardly radially to release said driven member permitting the driving member to overrun the driven member.

2. In a device of the class described, a rotatable driving member, a rotatable driven member capable of being locked thereto to rotate therewith, one of said members provided with a barrel head enclosing said coupling mechanism, which head is provided with an interior annular groove having angular extensions adapted at the ends to receive locking devices carried by said other rotatable member, said locking devices movable radially and held yieldingly outwards to seat in the ends of said tangential extensions to couple said driving and driven members together to rotate as one piece, said locking devices yieldable inwardly radially to uncouple said driving and driven members to permit the driving member to overrun the driven member upon resistance to rotation upon said driven member reaching a determined point.

3. In a device of the class described, a pair of relatively rotatable members capable of being coupled together to rotate as one piece, couplers carried by one member to engage the other member, one of said members provided with a barrel housing to enclose said couplers, said housing having an annular recess interiorly to receive said couplers, said annular recess provided with offset depressed portions capable of receiving said couplers, said couplers movable axially and radially into said offset depressed portions of the recess to couple said members together to rotate as one piece.

4. In a device of the class described, a rotatable driving member, a relatively rotatable driven member capable of being coupled thereto to rotate therewith, one of said members provided with a diametrically recessed coupler head, a pair of couplers mounted in said recess, a spring controlled plunger interposed between said couplers, said plunger movable axially to force said couplers radially, said other member having a casing enclosing said coupler head, said casing having recesses to receive said coupler devices to lock said members together to rotate as one piece when relatively rotated in one direction but not when the direction of rotation is reversed.

5. In a device of the class described, a rotatable driving member, a rotatable driven member capable of being coupled thereto to rotate therewith, coupling mechanism comprising couplers to engage said members together to rotate as one piece, one of said members provided with a barrel housing enclosing said coupling mechanism, which housing is provided with an annular groove having angular extensions adapted at the ends to receive the couplers carried by said other member to lock the members together to rotate as one piece, and said couplers held yieldingly outwards radially to engage in the ends of said extensions to lock said members together, and adapted to disengage said members when the resistance to rotation imposed upon the driven member reaches a determined point and adapted when released to travel through said angular extensions to enter the annular groove and to travel through said groove while permitting the driving member to overrun the driven member.

6. In a device of the class described, a rotatable driving member, a rotatable driven member capable of being coupled thereto to rotate therewith, couplers carried by one of said members to engage said members together to rotate as one piece, said other member provided with a barrel housing enclosing said couplers, said housing provided with an annular groove having angular extensions adapted at the ends to receive said couplers carried by said other member to lock the members together to rotate as one piece, said couplers held yieldingly outwards radially to engage in the ends of said extensions to lock said members together, and adapted to disengage said members when the resistance to rotation imposed upon the driven member reaches a determined point and adapted when released to travel through said angular extensions to enter the annular groove and to travel through said groove while permitting the driving member to overrun the driven member, and spring-controlled devices disposed to obstruct the travel of said couplers through said annular groove in one direction to cause the couplers to enter the angular extensions of said groove and adapted to permit the travel of the couplers through the annular groove in the opposite direction.

7. In a device of the class described, a rotatable driving member, a rotatable driven member capable of being coupled thereto to rotate therewith, a coupler carried by one member to engage said members together to rotate as one piece, said other member provided with a housing enclosing said coupler, said housing provided with an annular groove having an offset recess communicating therewith by an angular groove, said recess adapted to receive said coupler carried by said other member, said coupler held yieldingly outwards radially to engage in said recess to lock the said members together to rotate as one piece and movable inwardly radially to disengage said recess to uncouple said members and movable axially to travel through said angular groove to the annular groove and adapted to travel through the annular groove during the overrunning of the driven member by the driving member.

8. In a device of the class described, a rotatable driving member, a rotatable driven member capable of being coupled thereto to rotate therewith, couplers to engage said members together to rotate as one piece, one of said members provided with a barrel housing enclosing said couplers, said housing provided with an annular groove having offset recesses communicating therewith by angular grooves, said recesses adapted to receive said couplers carried by said other member, said couplers held yieldingly outwards radially to engage in said recesses to lock the said members together to rotate as one piece and movable inwardly radially to disengage said recesses to uncouple said members and movable axially to travel through said angular grooves to the annular grooves and adapted to travel through the annular groove during the overrunning of the driven member by the driving member, and devices disposed to obstruct the travel of said couplers through said annular groove in one direction and adapted to permit them to travel therethrough in the opposite direction.

9. In a device of the class described, a rotatable driving member, a rotatable driven member capable of being coupled thereto to rotate therewith, said driven member provided with a barrel head having an interior annular groove provided with angular extensions having depressions to receive coupler devices, said driving member provided with a coupler head rotatable therewith receivable within the barrel head of said driven member, opposed coupler devices carried by said coupler head movable axially and radially, an axially movable spring-controlled plunger disposed between the opposed inner ends of said coupler devices to hold the same outwardly radially to engage in the depressions of said angular extensions to lock said driving and driven members together to rotate as one piece, said coupler devices movable inwardly radially upon the imposition of restraint to rotation on said driven member reaching a determined point to release said driven member to permit the driving member to overrun the driven member and adapted to travel through said angular extensions of the annular groove into the annular groove to travel therethrough during such overrunning.

10. In a device of the class described, a rotatable driving member, a rotatable driven member capable of being coupled thereto to rotate therewith, said driven member provided with a barrel head having an interior annular groove provided with angular extensions having depressions to receive coupler devices, said driving member provided with a coupler head rotatable therewith receivable within the barrel head of said driven member, opposed coupler devices carried by said coupler head movable axially and radially, an axially movable spring-controlled plunger disposed between the opposed inner ends of said devices to exert outward pressure thereon to engage the coupler devices in the depressions of said angular extensions to lock said driving and driven members together to rotate as one piece, said coupler devices movable inwardly radially upon imposition of restraint to rotation on said driven member reaching a determined point to release said driven member to permit the driving member to overrun the driven member and adapted to travel through said angular extensions of the annular groove into the annular groove to travel therethrough during such overrunning, and spring-controlled interfering plates to obstruct the travel of said couplers through said annular groove in a given direction to cause the couplers to enter the angular extensions of said groove and adapted to be moved out of the path of travel of said couplers to permit their travel through said annular groove in the opposite direction.

In testimony whereof, I sign this specification.

JAMES A. STREET.